Aug. 17, 1926.

J. S. GREGORIUS 1,596,654

APPARATUS FOR MAKING SHEET GLASS

Filed Jan. 13, 1926   3 Sheets-Sheet 1

INVENTOR
Joseph S. Gregorius
by
James C. Bradley
Atty.

Aug. 17, 1926.

J. S. GREGORIUS 1,596,654

APPARATUS FOR MAKING SHEET GLASS

Filed Jan. 13, 1926   3 Sheets-Sheet 3

INVENTOR

Patented Aug. 17, 1926.

1,596,654

UNITED STATES PATENT OFFICE.

JOSEPH S. GREGORIUS, OF MOUNT VERNON, OHIO, ASSIGNOR TO PITTSBURGH PLATE GLASS COMPANY, A CORPORATION OF PENNSYLVANIA.

APPARATUS FOR MAKING SHEET GLASS.

Application filed January 13, 1926. Serial No. 80,943.

The invention relates to an apparatus for making sheet glass applicable where a continuous sheet is drawn from an open pool or bath; and involves an improvement on the Slingluff edge holding means of the type disclosed in the Slingluff Patent No. 1,549,513 of August 11, 1925. I have found that when this type of edge holding device is used over a pool surrounded by enclosing walls, which cut down the radiation of heat from the slotted plates, there is a tendency of the edges of the glass sheet to pull away from the plates, and the object of the invention is to overcome this difficulty.

Figure 1:
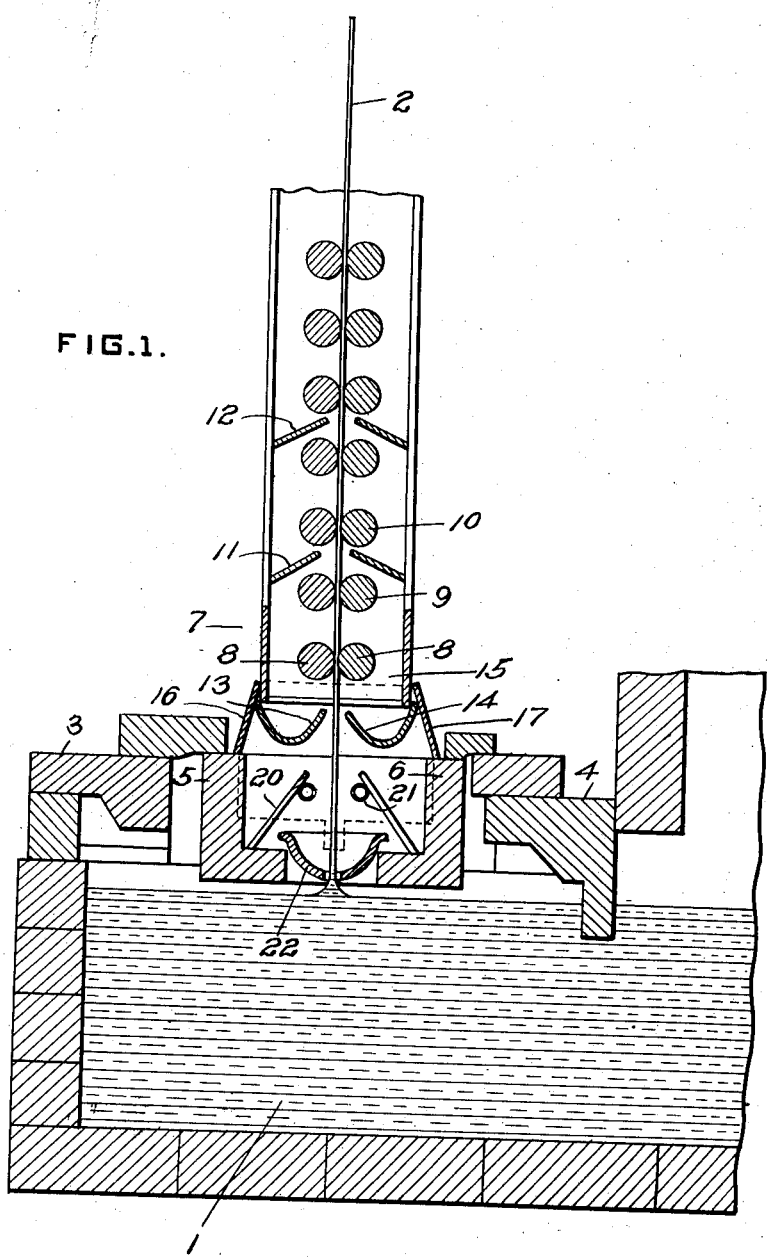
Figure 2:
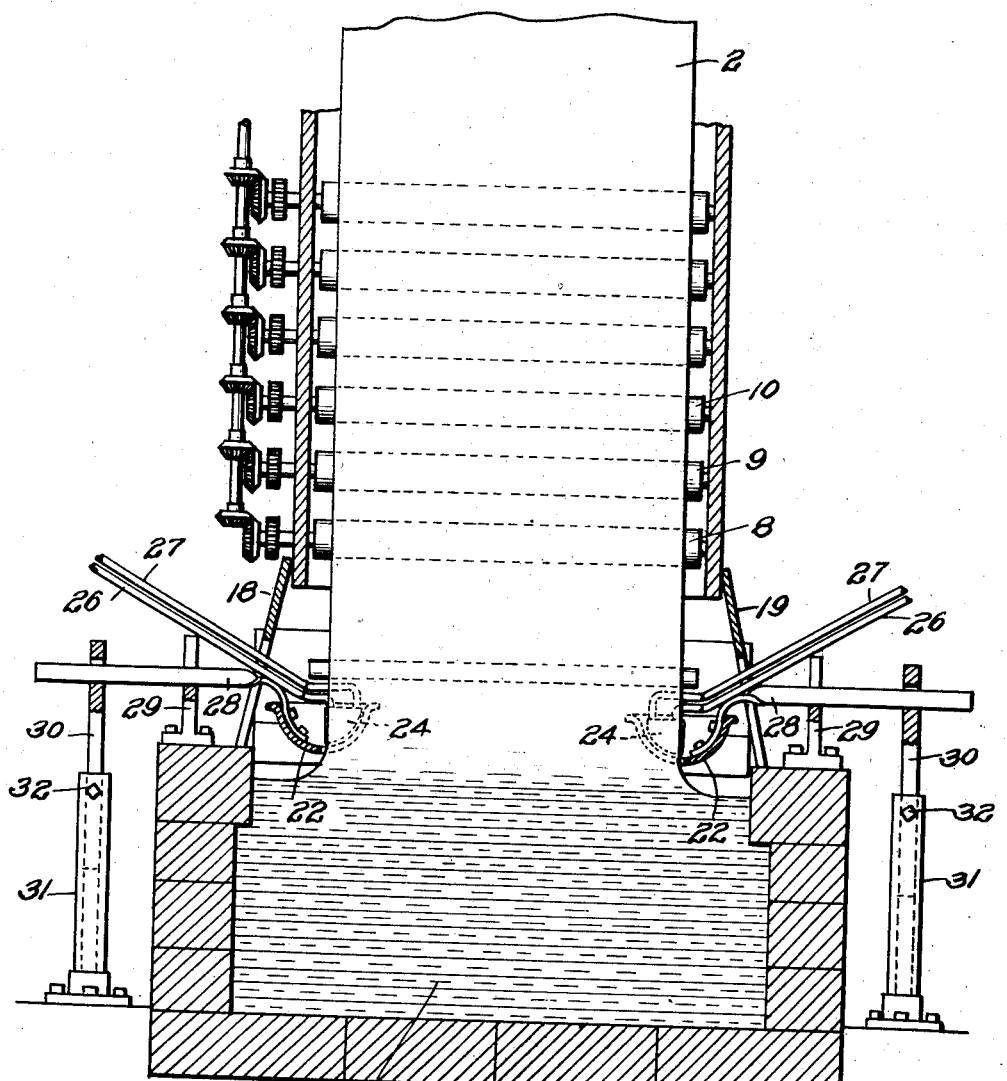
Figure 3:
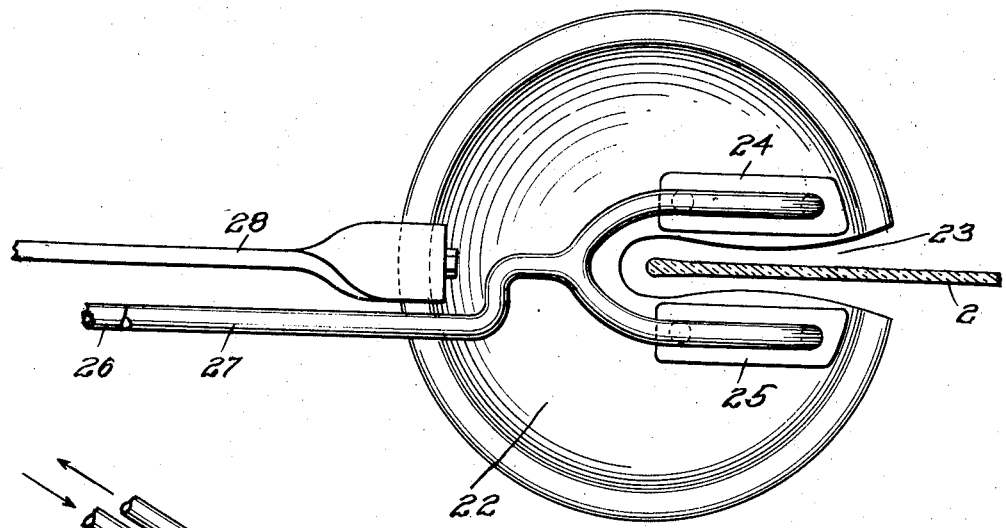
Figure 4:
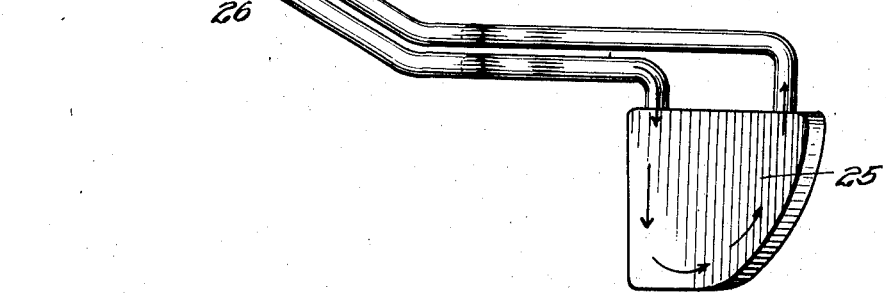

I have found that this may be accomplished successfully, and a close regulation of the temperature of the slotted edge of the holding disc secured by the use of a small two-part water cooler, which is set down into the device and preferably contacts with a limited area of the device along the sides of the slot through which the glass is drawn. The coolers are limited in size and the amount of water circulated therethrough is limited as a too great cooling tends to cause fire cracks and render the edges brittle. One embodiment of the invention is illustrated in the accompanying drawings, wherein:

Figure 1 is a vertical section through the apparatus. Fig. 2 is a vertical section taken at right angles to the section of Fig. 1. Fig. 3 is an enlarged plan view of one of the edge holding devices with the improvement applied thereto. And Fig. 4 is a side elevation of one of the cooling devices shown in Fig. 3.

Referring to the drawings, 1 is a forehearth or drawing tank connected with a melting tank preferably of the regenerator type from which the glass sheet or ribbon 2 is to be drawn continuously. The surface of the bath in the forehearth is partially covered over by means of the plates 3 and 4 and the L blocks 5 and 6. Mounted above the opening between the L blocks is the leer 7 which carries the means for drawing the glass continuously upward from the bath. The means employed for drawing the glass comprises a series of pairs of rollers 8, 9, 10, etc., driven by suitable means and either made up of asbestos discs or of central supporting members having an asbestos covering. The rolls lying on one side of the sheet are preferably fixed against lateral movement, while the rollers on the other side are yieldingly pressed against the sheet by means of counterweighted levers, as is well known in the art. Any other suitable drawing means might be employed.

The leer is divided into a series of compartments by means of the inclined baffle plates 11, 12, etc., and the temperature of these compartments decreases progressively upward so that the glass is gradually cooled and annealed as it passes through the leer, being cut into separate sheets as it emerges from the upper end of the leer. At the lower end of the leer is a pair of plates 13 and 14 of the shape indicated in Fig. 1, such plates acting as a partial closure for the compartment 15 at the bottom of the leer and also serving to catch any broken glass falling from this compartment.

The space into which the glass sheet is drawn beneath the leer is closed in by means of the end plates 16 and 17 and the side plates 18 and 19 and the glass is further shielded by means of the inclined plates 20 supported at their lower ends upon the L blocks 5 and 6 and resting at their upper ends against the transverse water cooled pipes 21.

The edge holding devices comprise the dish shaped members 22 slotted as indicated at 23 and located adjacent the surface of the bath. These members are preferably made of cast iron or cast steel and are relatively thick and heavy. In service, they become red hot and act as reflectors maintaining the areas of glass therebeneath considerably hotter than would otherwise be the case. The slots 23 are somewhat wider than the thickness of the glass and the contact between the glass and the edge of the slot is relatively slight. There is, however, sufficient adherence to prevent the edge of the sheet from working inward during the drawing operation unless the metal reaches too high a temperature, in which case, the devices will release their hold upon the edges of the sheet, and permit it to narrow. This overheating will not ordinarily occur if the space between the L blocks and the lower end of the leer is not closed in, but when such space is closed in, as is done by the use of the plates 16, 17, 18 and 19, this overheating and release of the edges of the sheet occurs. This condition is taken care of by the use of a pair of water coolers 24 and 25 arranged on either side of the slot 23, as indicated in Fig.

3, and each provided with a pair of water pipes 26 and 27 for circulating water through the members 24 and 25, 26 being the inlet pipe and 27 being the outlet pipe. The boxes or members 24 and 25 are preferably of the shape shown in Figs. 3 and 4, and are set down into the dish-shaped plate 22 so that their lower portions contact with the upper surface of the members 22. The plates 22 are in this manner cooled to a limited degree along the edges of the slots 23, and as a result, the glass edge will not pull away from the plate. The amount of water circulated through the pipes 26 and 27 must be carefully regulated, as too much cooling will chill the edge of the sheet to too great an extent, making such edge too hard and tending to roughen the edge and cause breakage.

The plates 22 may be supported in any desired manner, so that they can be adjusted to meet requirements. As illustrated, the plates are supported upon bars 28 passing through forked supports 29 seated upon the side walls of the furnace, the rear end of the bars passing through adjustable rods 30 carried by the standards 31. The position of the rod 30 is fixed by means of the set screw 32. The invention is not limited to the use of a slotted plate 22 of the form illustrated, although this type of plate located with its convex side down and closely adjacent to the surface of the glass is the preferred form of construction, and the one which has given the best results. The cooling boxes or members 24 and 25 may also be made of other shapes than the one shown, and do not necessarily have to contact with the surface of the plate 22, although it is preferred to have such contact so that the metal of the plate is cooled by conduction.

What I claim is:

1. In combination with apparatus arranged to draw a glass sheet from an open pool of molten glass, of means for preventing inward movement of the edge of the sheet in said pool comprising a shielding plate spaced above the surface of the pool but closely adjacent thereto and having a slot extending inward from its edge and fitting around the edge of the sheet, a cooling member mounted on the plate along each side of the slot, and means for circulating a cooling liquid through said members.

2. In combination with apparatus arranged to draw a glass sheet from an open pool of molten glass, of means for preventing inward movement of the edge of the sheet in said pool comprising a shielding plate of dish shape, with its convex side down, spaced above the surface of the pool, but closely adjacent thereto and having a slot extending inward from its edge and fitting around the edge of the sheet, a cooling box or member extending down into the shielding plate adjacent to said slot on either side thereof, and means for circulating a cooling liquid through said boxes or members.

3. In combination with apparatus arranged to draw a glass sheet from an open pool of molten glass, of means for preventing inward movement of the edge of the sheet in said pool comprising a shielding plate, spaced above the surface of the pool but closely adjacent thereto and having a slot extending inward from its edge and fitting around the edge of the sheet, a cooling box or member extending down into the shielding plate and contacting with the surface of the shielding plate, and means for circulating a cooling liquid through said boxes or members.

In testimony whereof, I have hereunto subscribed my name this 18th day of December, 1925.

J. S. GREGORIUS.